United States Patent [19]

Bonetti

[11] Patent Number: 4,483,193
[45] Date of Patent: Nov. 20, 1984

[54] MAGNETIC LEVEL INDICATORS

[75] Inventor: Giulio Bonetti, Garbagnate Milanese, Italy

[73] Assignee: Cesare Bonetti S.p.A., Milan, Italy

[21] Appl. No.: 412,601

[22] Filed: Aug. 30, 1982

[30] Foreign Application Priority Data

Oct. 2, 1981 [IT] Italy ................................ 24279 A/81

[51] Int. Cl.³ .............................................. G01F 23/12
[52] U.S. Cl. ........................................ 73/313; 73/319; 73/DIG. 5; 73/328
[58] Field of Search ............ 73/308, 313, 319, DIG. 5; 200/84 C

[56] References Cited

U.S. PATENT DOCUMENTS

| 2,233,572 | 3/1941 | Atkins | 73/319 |
| 2,685,797 | 8/1954 | Morschel | 73/319 |
| 2,927,176 | 3/1960 | Auld, Jr. et al. | 200/84 C X |
| 3,051,805 | 8/1962 | Binford | 200/84 C X |
| 3,729,697 | 4/1973 | Hounsegard | 200/84 C X |
| 3,964,312 | 6/1976 | Sebed | 73/DIG. 5 X |
| 4,194,397 | 3/1980 | Yasuda | 73/319 X |

*Primary Examiner*—Daniel M. Yasich
*Attorney, Agent, or Firm*—Bucknam & Archer

[57] ABSTRACT

Apparatus for the visual indication of the level of liquid contained in boilers, tanks, reservoirs or the like is described, comprising an outer tube connected to the receptacle and having a float which contains a permanent magnetic dipole. Adjacent the tube is a column of rotatably mounted bi-colored cylinders, some of which show one color and the rest another when viewed from one direction, to indicate the level of the liquid. In accordance with the invention, the permanent magnetic dipole is automatically orientated by the magnets in bi-colored cylinders as it is mounted rotatably about a vertical axis.

6 Claims, 3 Drawing Figures

MAGNETIC LEVEL INDICATORS

FIELD OF THE INVENTION

This invention relates to magnetic level indicators for giving a visual indication of the level of liquid contained in boilers, tanks, reservoirs or the like, operating by means of a float which contains a permanent magnetic dipole which is able to make a plurality of magnetic dipoles having faces of two different colours rotate so that these indicate the position of the float.

SUMMARY OF PRIOR ART

Level indicators are known in the art, operating on the principle of communicating chambers, which indicators, so that they can be used in contact with chemically aggressive liquids, liquids at high pressure or high temperature, atmospheric pollutants, liquids dangerous or poisonous to humans, inflammable or explosive liquids, or else at the interface between two liquid phases of identical optical characteristics, are provided with a float which contains a permanent magnet, inserted into a non-magnetic metal tube communicating with the receptacle containing the liquid, the level of which is to be indicated. Outside the tube and running next to it there is located a small column containing a series of magnetic dipoles which are each rotatable about an axis perpendicular to that of their magnetisation, and which have two differently coloured faces, one of which is visible through a part of the column made of transparent material.

In such an arrangement, as the float with the magnet moves up and down within the tube communicating with the receptacle, the dipoles are rotated, which changes the colour visible through the transparent part of the column. It is thus possible to see a section of dipoles showing one colour (for example red) corresponding to the liquid phase, a section in which the dipoles show their opposite faces (for example coloured white), corresponding to the gaseous phase (or the lighter liquid), and a section corresponding to the interface level in which one or more of the dipoles are in an incompletely rotated position, due to the perturbation of the magnetic field caused by the float containing the magnet.

In the prior art there has until now been the problem of maintaining the magnet inserted in the float in a well defined position, that is to say presenting a polarity which always faces towards the coloured dipoles of the column for the purpose of being able to exert its action for the rotation of the said dipoles. The solutions adopted up to now have had disadvantages due to the heavy weight of the magnetic element or to the necessity of introducing float guide elements into the tube with consequent increases in costs and the possibility of operating irregularities.

GENERAL DESCRIPTION OF THE INVENTION

According to the present invention there is provided a magnetic level indicator including a float which is free to slide within a tube communicating with a receptacle containing a liquid the level of which is to be indicated, the float containing a first permanent magnetic dipole of elongate form mounted rotatably about an axis parallel to the axis of the tube, the elongation of the dipole extending perpendicular to its axis of rotation, and including a plurality of rotatable second permanent magnetic dipoles having different colourations when viewed from different angles and arranged in a line parallel to the axis of the tube and sufficiently adjacent thereto to interact with the magnetic dipole in the float, the axis of rotation of each of the permanent magnetic dipoles being perpendicular to the line.

Mounting the magnetic element in the float in this way permits guide elements within the tube to be eliminated and at the same time allows a magnet of limited dimensions to be used.

The float is conveniently in the form of a hollow cylinder closed at its ends, the permanent magnet being mounted in such a way as to be free to rotate about the longitudinal axis of this cylinder.

The magnet in the float, in accordance with the invention, is there mounted in such a way that it can orientate in dependence on the action of an external magnetic field such as that generated by the line of rotatable magnetic dipoles which constitute the level indicator column. The orientation of the magnet is therefore independent of that of the float cylinder which contains it, and is therefore not disturbed by movements of this float cylinder. Moreover, since the magnet in the float is horizontal and unguided, this allows a minimum number of cylinders of the line (one or two) to be affected by its magnetic field, inasmuch as the magnetic field can be limited to a very restricted area thus increasing the precision of the level indication.

SPECIFIC DESCRIPTION OF THE DRAWINGS

The invention is illustrated in more detail with reference to an exemplary embodiment thereof, which can be seen in the attached drawings, in which.

Figure 1:
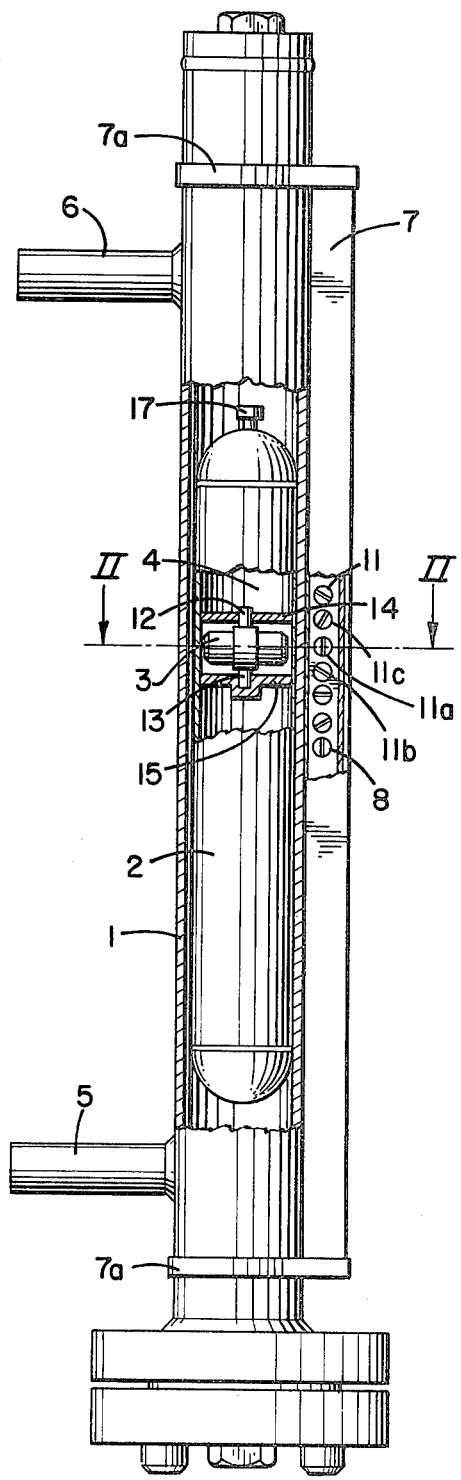
FIG. 1 is a view of a level indicator according to the invention, partly in longitudinal section and showing the float.
Figure 2:
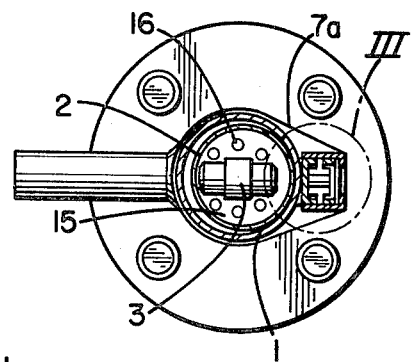
FIG. 2 is a section taken on the lines II—II of FIG. 1.
Figure 3:
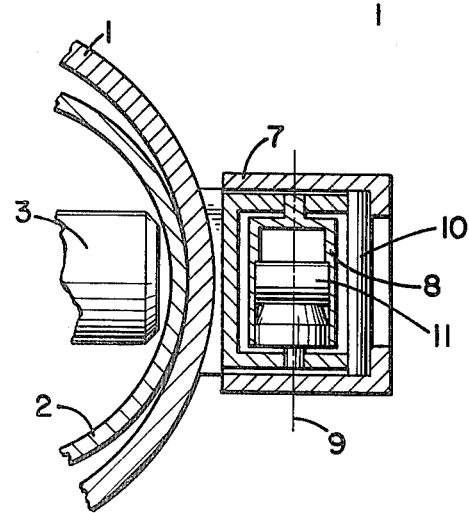
FIG. 3 is the detail III of FIG. 2 shown on an enlarged scale.

The level indicator shown in the drawings is essentially constituted by a cylindrical casing 1, of substantially tubular form, within which a float 2, which is also cylindrical, but of slightly smaller diameter, can slide. The float cylinder 2 contains within it, in a position corresponding to its float line in the liquid, a permanent magnet 3 which is free to rotate about an axis 4, which coincides substantially with the longitudinal axis of the float itself.

Outside the tube 1, which communicates by means of tubes 5 and 6 with the receptacle containing the liquid the level of which is to be indicated, there is located, a short distance away, a column 7 retained by the strips 7a, having a transparent side 10 and containing a plurality of small cylinders 8 each rotatable about an axis 9.

Within each cylinder 8 there is rigidly fixed a magnetic dipole 11. The cylinders 8 have two different colorations on the two halves divided by a longitudinal plane, and the dipoles 11 are inserted in such a way as to have their axis lying on this plane and perpendicular to the axis 9. Magnet 3 is secured in the float 2 by means of pivot pins 12, 13 rotating in suitable seats in a pair of discs 14 and 15 rigidly fixed to the interior of the float itself.

The discs or wall means 14 and 15 holes 16 for equalising the pressure within the float.

The level indicator described operates as follows:

In a position spaced from the float the magnetic dipoles 11 are free to rotate about the axis 9 of the cylinders 8 which contain them and thus align themselves together in a direction parallel to the magnetic field which they generate themselves, that is to say each magnetic pole facing an opposite pole of the adjacent dipole.

In this way, through the transparent front element 10 there will be visible a chain of cylinders 8 which up to a certain point have a given coloration and beyond that the opposite colouration the said point being determined by the height of the level of the surface of the liquid due to the fact that the magnetic field of the dipole 11 is modified by the magnet 3 contained in the float. Magnet 3 is attracted by the field of the dipoles 11 and is therefore orientated by this field to lie with its own axis pointing towards the dipoles 11.

The intensity of magnetisation of the magnet 3 is suitably chosen in such a way as to be able to cause a certain number of cylinders (for example two or three) to rotate without, however, being such as to completely overcome the field of the dipoles 11 themselves, in such a way that this field always succeeds in maintaining the orientation of the magnet 3 constant.

The presence of the magnet 3 causes a rotation of the dipoles 11 which tend to abandon their initial vertical configuration and dispose themselves horizontally, parallel to the magnetic axis of the magnet 3. Therefore, if the dipoles, in the lower section below the magnet 3, are initially disposed with their N-pole facing, for example, downwardly, the presence of the said magnet 3, facing with its N-pole towards the said dipoles, causes the element 11a facing it to become displaced with its own axis horizontal; the element 11b is located in an inclined position with its N-pole facing downwardly and the element 11c is located in an inclined position with its N-pole facing upwardly. The elements located above the magnet 3 will now be all parallel and orientated with their N-poles upwardly.

In this way the cylinders 8 with which the dipoles are rigidly connected, show in the upper region of the column 7 the oppositely coloured side, for example white, from that shown in the lower region, for example red.

A variation in the level of the liquid in the cylinder 1 will consequently cause the displacement of the float in the said cylinder and therefore the displacement of the colour inversion zone, therefore showing the new position of the liquid level. Since, as mentioned, the orientation of the magnet 3 is due to the opposite orientations of the magnetic fields of the dipoles 11 in the sections respectively below and above the magnet 3, it is not necessary to provide any other device for controlling the position of the said magnet.

Rather, it is provided by a particular feature of the invention, in that the pivot pins 12 and 13 rotate within seats formed in the discs 14 and 15 made of suitable low friction material, such as plastics material (for example polytetrafluoroethylene), for the purpose of always permitting the best orientation of the magnet 3 towards the column of dipoles 11. The float 2 can be pressurised, or else at atmospheric pressure or ambient pressure, in this latter case being put in communication with the gas phase by means of the vent 17. The float assembly 2, including the magnet 3, is made in such a way that the floating line is at the height of the axis of said magnet 3 in the temperature and pressure conditions in the installation in which it is intended to be used. In the event that there are significant variations in the ratio between the relative specific gravity of the liquid phase and gas phase (for example water and steam close to the critical point and at ambient temperature and pressure) a calibration curve will be used to derive the real level which would arise in different temperature conditions from those experienced in use, this being based on the reading given by the level indicator.

The cylindrical body 1, the float 2 and the column 7 can be made of different materials, such as, for example, stainless steel, aluminium, PVC and the like, in dependence on the requirements, which have non-magnetic characteristics and remaining in each case within the scope of the present invention.

It will further be possible, without departing from this, to introduce numerous constructional variations thereto, for example to the form of the columns 7, the cylinders 8, the float 2 and the pivotal system for the magnet 3; cylinder 1 can be connected to the container in which the liquid whose level is to be indicated is in various different known ways.

I claim:

1. In a magnetic level indicator including a float (2) which is free to rise or fall with a liquid within a tube (1) communicating with a receptacle containing said liquid the level of which is to be indicated, the float containing a first permanent magnetic dipole (3) of elongate form located with its longitudinal axis at the level of said liquid in said tube and the indicator including a plurality of rotatable cylinders (8) mounted in a column (7) located adjacent to said tube, a plurality of second permanent magnetic dipoles (11) fixedly located in said cylinders, each of said dipoles each having a magnetization parallel to its longitudinal axis, said cylinders having different colorations when viewed from different angles and arranged in a line parallel to the axis of the tube and sufficiently close to the axis of the tube to interact with said magnetic dipole in the float, the axis of rotation of each of the second permanent magnetic dipoles being perpendicular to said longitudinal axis of said float, the improvement consisting of mounting the first permanent magnetic dipole on wall means extending transversely (3) within the float and rotatably on means about an axis (4) parallel to the axis of the tube, the orientation of said first permanent magnetic dipole being independent of the float, with the elongation of said first dipole extending perpendicular to its axis of rotation.

2. The level indicator of claim 1, wherein the first permanent magnetic dipole of elongate form, has the shape of a cylinder and is mounted with its axis of rotation perpendicular to is axis of symmetry and its internal magnetic field being parallel to its axis of symmetry.

3. The level indicator of claim 2 wherein the first permanent magnetic dipole is mounted on two pins being set rotatably in seats formed in the centers of two discs of the wall means, the discs being rigidly secured to the interior of the float in positions respectively below and above the first permanent magnetic dipole.

4. The level indicator of claim 3, wherein the discs have pressure compensation holes.

5. The level indicator of claim 1, and including means enabling the pressure inside the float to be varied.

6. The level indicator of claim 1, wherein each of the second permanent magnetic dipoles is in the form of a cylindrical magnet secured within a cylindrical container, the axes of magnet and container being perpendicular, and the exterior of the container being longitudinally divided into two substantially equal differently colored parts.

* * * * *